United States Patent [19]

Salotti et al.

[11] 3,820,855
[45] June 28, 1974

[54] ANTI-SKID BRAKING SYSTEM

[75] Inventors: Gianfranco Salotti; Mario Palazzetti, both of Avigliana, Italy

[73] Assignee: Fiat Societa per Azioni, Turin, Italy

[22] Filed: Oct. 25, 1972

[21] Appl. No.: 300,607

[30] Foreign Application Priority Data
Oct. 29, 1971 Italy .................................. 70568/71
Apr. 19, 1972 Italy .................................. 68224/72

[52] U.S. Cl. ............. 303/21 BE, 188/181 A, 303/20
[51] Int. Cl. .............................................. B60t 8/12
[58] Field of Search ................ 188/181; 303/20, 21; 324/161–162; 340/52 R, 53, 262–263

[56] References Cited
UNITED STATES PATENTS
3,578,819 5/1971 Atkins ............................ 303/21 BE
3,584,921 6/1971 Crawford ........................ 303/21 BE
3,635,530 1/1972 Packer et al. ..................... 303/21 P
3,710,186 1/1973 Sharp ........................... 188/181 A X

*Primary Examiner*—Milton Buchler
*Assistant Examiner*—Stephen G. Kunin
*Attorney, Agent, or Firm*—Sughrue, Rothwell, Mion, Zinn & Macpeak

[57] ABSTRACT

An anti-skid braking system and a process for anti-skid braking are disclosed. The system operates to release the brakes of a wheel whenever skidding is imminent this being detected from a signal representing the angular velocity of the wheel. A reference signal is then generated after a predetermined time delay and compared with the angular velocity signal. The value of the reference signal lies between the value of the angular velocity signal at the instant when the brakes are released and the value of the angular velocity signal after the said predetermined time delay. The two signals are then compared and the brakes are reapplied when the two signals have the same value, this occurs as the angular velocity of the wheel, after an initial delay, starts to increase when the brakes are released.

3 Claims, 4 Drawing Figures

ANTI-SKID BRAKING SYSTEM

The present invention relates to anti-skid braking systems, and particularly to apparatus for processing the control signals of an anti-skid braking system.

One problem in anti-skid braking systems arises due to the rapidity at which the brakes must be released when an incipient skid state of the wheels of a vehicle is detected. Another problem lies in determining when the braking is to be resumed: this has to be effected in such a manner as to prevent the friction between the road and the wheels from becoming so great as to prejuduce braking efficiency, that is the brakes must not be reapplied so soon that a return to the skid conditions immediately occurs.

Although the first of these problems may have been at least partly overcome with anti-skid braking processes which are capable of operating sufficiently rapidly to release the brakes in time, no entirely satisfactory solution has yet been found for the second problem. In general, previously known anti-skid control devices delay resumption of braking for too long in order to safely avoid skidding, but this considerably reduces braking efficiency and extends the braking distance. Too much delay in re-applying the brakes also has the secondary disadvantage that excessively rapid changes of the braking couple occur during the anti-skid control operation, and this has consequent effects in causing jerks and shocks which deleteriously affect the comfort of passengers and, more seriously, dangerously affect the stability of the steering and therefore the road holding ability of the vehicle.

One solution to this problem has been proposed in a prior art system. In this system, in order to eliminate or reduce the delay in resumption of braking after a release of braking pressure by the anti-skid braking system, there is introduced a correlation between the moment when braking is resumed, and the moment when the brakes were released, by resuming braking when the angular velocity of the wheel of the vehicle reassumes the value which it had at the moment when the brakes were actually released.

This prior solution to the problem enables relatively good results to be achieved as far as the braking efficiency and reduction of braking distance is concerned, in addition the comfort of the passengers and road-holding of the vehicle are not as deleteriously affected as they were during the operation of previous anti-skid braking systems.

However, in order to operate in accordance with this method it is necessary to provide two separate data signals, that is a signal representing the speed of the wheel and a signal representing the acceleration of the vehicle. Whilst the signal representing the speed of the wheel can be provided by a relatively low cost angular velocity transducer, the acceleration signal can only be obtained from an accelerometer mounted, for example, upon the body of the vehicle. Accelerometers, however, are expensive and the use of accelerometer unduly increases the cost of the system as a whole. Moreover, besides being costly, accelerometers are also rather delicate and subject to variations of response as a result of vibrations, temperature changes, and so forth. These response variations may be quite considerable so that signals supplied by the accelerometer often do not have the required reliability and accuracy for this purpose.

The present invention seeks, therefore, to provide a device for processing anti-skid braking control signals for a vehicle, which does not require the availability of a signal representing the acceleration of the vehicle, thus avoiding the abovementioned disadvantages attendant upon the use of accelerometers, while at the same time maintaining efficient braking.

According to the present invention an anti-skid control device for the brake of at least one wheel of a vehicle, of the type comprising a device for detecting the angular velocity of the wheel and for producing an output signal in dependence thereon, a braking control circuit sensitive to the signal representing the angular velocity of the wheel and responsive thereto to control the brake to release the braking pressure when the derivative of the angular velocity signal exceeds a predetermined negative threshold value, in which the braking control circuit comprises a transistor the base of which is coupled to the output of the angular velocity transducer and the emitter of which is earthed and also connected to a threshold circuit which changes from a first state to a second state to produce an output signal to control an actuator device to release the braking pressure, whenever the derivative of the angular velocity signal exceeds the said predetermined negative threshold, there being a reference signal generating circuit coupled to the output of the threshold circuit and operative to produce, after a predetermined time interval a reference signal the value of which lies between the value of the angular velocity signal at the instant when the threshold circuit produced the said output signal to control the release of the braking pressure, and the value to which the angular velocity signal has fallen in the said predetermined time interval, the delayed reference signal and the instantaneous angular velocity signal being compared in such a way that the threshold circuit returns to its first state, thereby allowing the brakes to be reapplied, at the point in time where the instantaneous angular velocity signal exceeds the delayed reference signal.

Embodiments of the present invention thus form anti-skid braking systems of low cost, which can provide great uniformity of operation owing to the fact that adjustment of the control device can be effected by a single calibration operation on a single signal source rather than upon two different independent signal sources, thus limiting the error possiblity.

A first embodiment of the invention is characterised in that the emitter of the said transistor is connected to earth through a first capacitor, in that the said delay circuit includes a monostable multivibrator controlled by the output signal from the threshold circuit, a further transistor of a type complementary to the said transistor, the base of which is earthed, the emitter of which is coupled via a second capacitor to the output of the monostable multivibrator, and the collector which is connected to the emitter of the said transistor, the period of the monostable multivibrator being equal to the said predetermined time interval and the amplitude of the output signal multiplied by the ratio of the capacities of the first and second capacitors determining the decrement by which the reference signal is less than the value of the angular velocity signal at the point in time when the threshold circuit changes from its first state to its second state, the said reference signal being constant.

A second embodiment of the invention is characterised in that the said angular velocity transducer produces an output signal the frequency of which is related to the angular velocity of the wheel and is connected to a pulse shaping circuit which produces from the transducer signal a train of pulses of constant width, the pulse repetition frequency of which is related to the frequency of the signal from the transducer, and in that the said reference signal generating circuit comprises a capacitor connected to the output of the pulse shaping circuit so as to be periodically charged by the output signal pulse therefrom, a discharge circuit by means of which the capacitor can periodically discharge, the discharge circuit including a normally closed switch device, the threshold device comprising a differentiator circuit connected in parallel with part of the discharge circuit, and a trigger circuit coupled to the output of the differentiator circuit, the trigger circuit normally being in a first state and having a second state to which it commutes when the output signal from the differentiator circuit exceeds a predetermined negative threshold value, and in which it produces an output signal to control the release of the braking pressure, and a timing circuit connected to the output of the trigger circuit and operative to produce an output signal to open circuit the said switch device for the said predetermined time interval after the commutation of the trigger circuit to prevent the discharge of the said capacitor for this time interval.

Two embodiments of the invention will now be more particularly described, by way of example, with reference to the accompanying drawings, in which.

Figure 1:
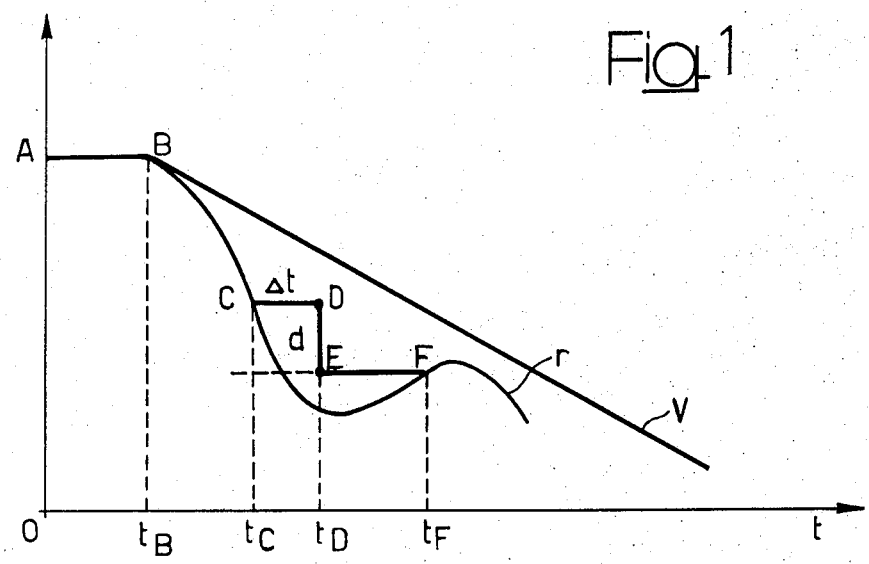
FIG. 1 is a graph illustrating the manner of operation of a first embodiment of the invention.

Referring now to FIG. 1, the time $t$ is shown along the abscissa, and the variation of the speed $v$ of a vehicle and the variation in the angular velocity, or speed of rotation, $r$ of a wheel of the vehicle during a braking operation in which the antiskid device intervenes, are shown along the ordinate. During the time interval from a nominal starting pont 0 at a time $t_B$ when braking commences, the line V representing the speed of the vehicle, and the line $r$ representing the rotational speed of the wheel, both coincide (with suitable scale selection). This is normal when the wheel is not braked.

When, at the instant $t_B$ the braking operation starts, the speed $v$ of the vehicle begins to decrease due to the braking of the wheel; this decrease in speed is substantially linear and also substantially independent of fluctuations in the speed of the wheel, due to the considerable inertia of the vehicle. The speed $r$ of the wheel, on the other hand, may differ considerably from the speed of the vehicle, as a result of running over different types of road surface. It is known to effect a reduction of the braking pressure, that is the force applied to the brakes, when deceleration of the wheel represented by the negative slope of the curve $r$ exceeds an acceptable safety threshold. In FIG. 1 threshold is exceeded at the point C of the curve $r$, corresponding to the instant $t_C$, and so a control signal to reduce the braking pressure will be generated by the anti-skid control device at this instant in time. After the braking pressure has been reduced the wheel continues to decelerate due to the intrinsic response delays of the mechanical parts of the system, until the deceleration of the wheel ceases and the speed of the wheel starts to rise, tending to approach the speed of the vehicle.

For the maximum braking efficiency, it is advantageous to re-apply the full braking pressure to the wheel at a point F of the curve $r$ representing the speed of the wheel, at which point the wheel, after having started to re-accelerate following the initial deceleration interval due to the delay in response time of the device has not yet reached a speed which is too close to the speed of the vehicle, and which would be associated with a low braking efficiency.

The device described in the above mentioned patent application operates to generate a control signal which starts at the point C and lies parallel to the line $v$ of the vehicle velocity. The brakes are then reapplied at the instant when this control signal intersects the curve $r$, at the point F. The precise position on the curve $r$ of the point F, and consequently the precise instant $t_F$ at which braking of the wheel should be resumed, is not critical, since this point can move, within certain limits, along the curve $r$ without greatly prejudicing the braking efficiency provided that it is at a sufficient distance from the curve $v$.

It has been discovered that it is possible to obtain results substantially equivalent to those obtained with the device described in the abovementioned prior Patent application by generating a reference signal representing a speed of the wheel less than the speed of the wheel at the instant at which the anti-skid control device operates to reduce the braking pressure, by a given decrement. This signal is then compared with the signal representing the actual speed of the wheel and the braking recommenced when the two signals have the same value. The appropriate decrement must be determined in each case, in relation to the type of vehicle and the particular characteristics of the anti-skid braking system employed, in order to establish the optimum position of the point F at which braking is resumed for all the various possible braking conditions. It has been found that in an experimental vehicle equipped with an embodiment of the invention, an optimum value for the decrement $d$ is between 5–6 Km/hour. This result was obtained by simulating braking operations in a digital computer, to cover various typical braking conditions, such as the type of ground and speed of the vehicle.

Generation and comparison of the signal representing the speed of the wheel at the instant $t_C$, reduced by the given decrement, cannot be effected immediately after the instant $t_C$ since the wheel takes a finite time to fall below this value itself and this would require the use of circuits which would ignore the first intersection between the generated reference signal and the signal representing the actual speed of the wheel, which follows the curve $r$. Therefore, the value of the signal representing the speed $r$ of the vehicle at the instant $t_C$ is stored for an interval of time $\Delta t$ until the instant $t_D$, the signal is then reduced, by the decrement $d$ at the instant $t_D$ and the signal thus generated is compared with the signal representing the actual value of the speed of the wheel until these signals attain the same value, at the instant $t_F$ the braking is then resumed at this point.

The length of the time interval Δt is selected to be sufficiently large to ensure that the curve of the reference signal CDEF will always be greater than the curve r of the signal representing the actual speed of the wheel, until the desired intersection point F.

Figure 2:
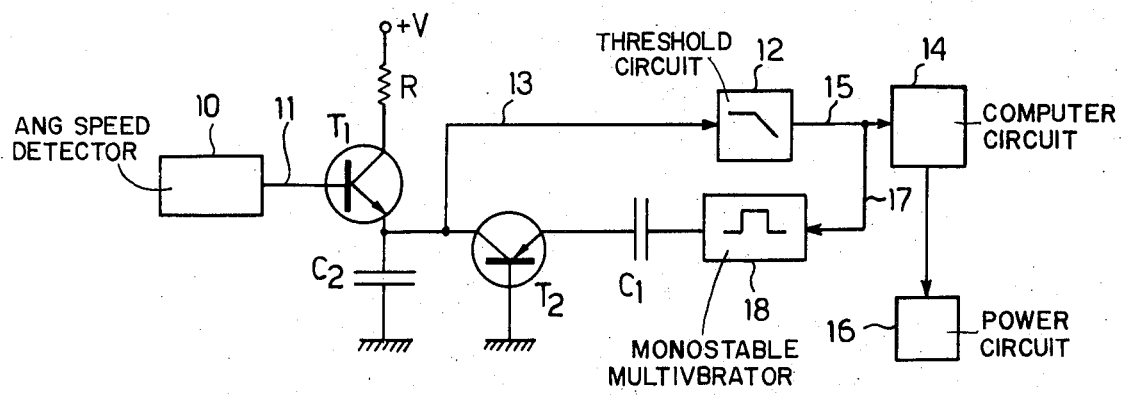
FIG. 2 is a partially diagrammatic circuit diagram of a first embodiment of the invention.
Figure 3:
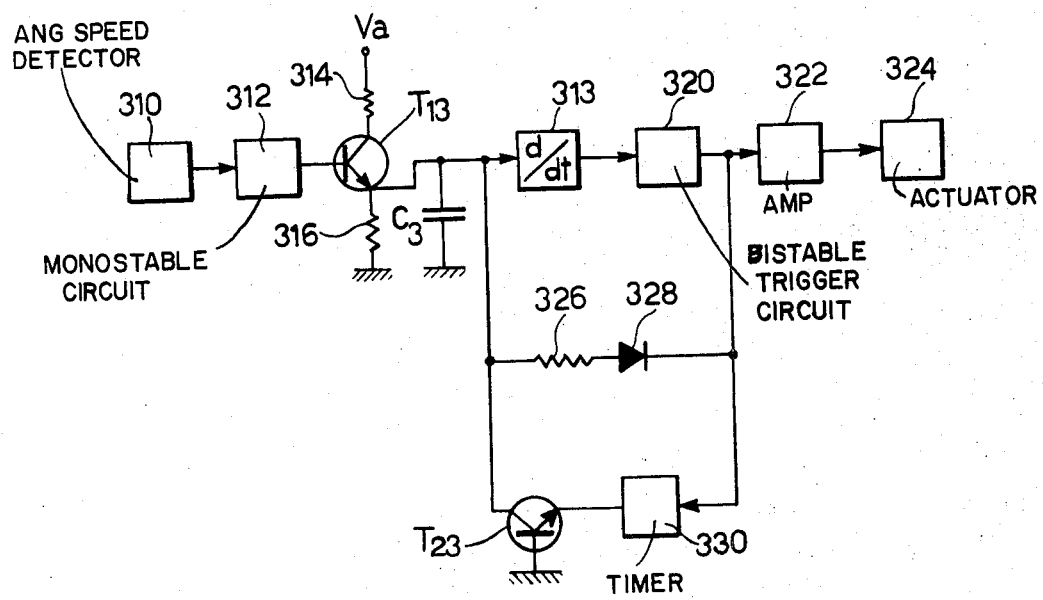
FIG. 3 is a partially diagrammatic circuit diagram of a second embodiment of the invention.

Referring now to FIG. 2 the device comprises an angular speed detector, which may be of known type, which is associated with a wheel (not shown) of the vehicle on which the braking system is fitted. The detector 10 provides an output signal on an output line 11 proportional to the speed of the wheel. The line 11 is connected to the base of an NPN transistor $T_1$ the collector of which is connected to a direct voltage supply $+V$ through a load resistor R, and the emitter of which is connected to earth through a series connected capacitors $C_2$.

The emitter of the transistor $T_1$ is also connected to a threshold circuit 12, by a line 13; the output 15 of the threshold circuit 12 controls computer circuits 14 and power circuits 16 of a known type, for anti-skid control of the brake.

A line 17 connects the output 15 of the threshold circuit 12 to the input of a monostable multivibrator 18 the output of which is connected through a series capacitor $C_1$ to the emitter of an NPN transistor $T_2$ the base of which is earthed and the collector of which is connected to the emitter of the transistor $T_1$.

When the speed of the wheel drops at a rate greater than an acceptable threshold rate, so that the wheel approaches a dynamic state of imminent skid, the threshold circuit 12 detects the passing of the deceleration threshold in the signal transferred to its input by the transistor $T_1$, and produces an output signal which is passed to the computer circuits 14 which control the power circuits 16, to effect a reduction of the braking on the wheel. Simultaneously the output signal from the threshold circuit 12 is passed to the input of the monostable multivibrator 18 along the line 17, to initiate operation thereof. At the end of one operating period of the monostable circuit 18, (which is selected to be equal to the time delay Δt of FIG. 1), the monostable circuit produces an output voltage pulse which is passed via the capacitor $C_1$, and the emitter base junction of the transistor $T_2$ to earth. Since the base of the transistor is earthed, then $\alpha \approx 1$.

THis discharge renders the collector-emitter junction of the transistor $T_2$ conductive, allowing the capacitor $C_2$ to share its charge with the capacitor $C_1$, following which the drop in the voltage at the collector of the transistor $T_2$: $d = U \cdot C1/C2$, where U is the amplitude of the voltage pulse emitted by the monostable multivibrator 18, and C1 and C2 are the capacities of the two capacitors $C_1$ and $C_2$. These parameters may thus be selected to obtain the desired voltage decrement d (see FIG. 1).

The signal then remains at this value until the intersection at F with the curve representing the instantaneous angular velocity of the wheel; at this instant the threshold circuit 12 changes back to its original state and controls resumption of the braking through the line 15.

Figure 4:
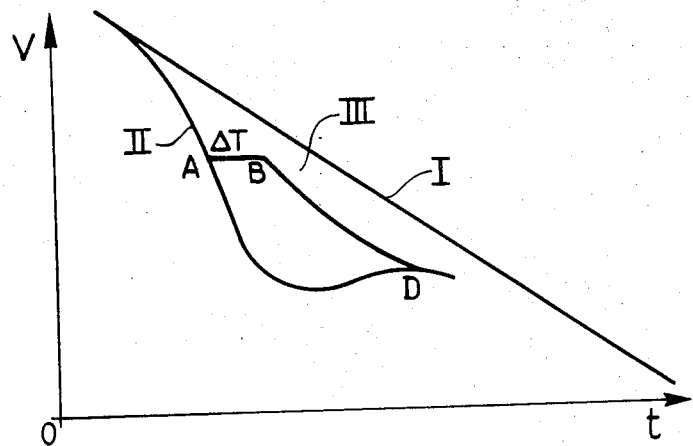
FIG. 4 is a graph illustrating the operation of the second embodiment of the invention.

Referring now to FIG. 4, there is shown a second embodiment of the invention, comprising an angular velocity transducer 310 of the type which supplies an alternating electric signal the frequency of which is proportional to the angular velocity of a wheel (not shown) with which it is associated. The transducer 310 may conveniently be of the type commonly known as a "phonic wheel," but it may equally well be any other suitable type of tachometric device.

The signal produced by the angular velocity transducer 310 is applied to the input of a monostable circuit 312 which operates to convert the alternating input signal (which may be either a square waveform or a sinusoidal waveform) into a series of pulses of constant width and of repetition frequency proportional to the frequency of the signal received. Conveniently the monostable circuit 12 may be a circuit of the type described in U.S. Pat. No. 3,757,142 (known as a "monostable trigger"), because of the operational reliability which is characteristic of this circuit. This "monostable trigger" circuit has the characteristics both of a bistable circuit and also of a monostable circuit, that is, it has a normal operational state, and a "reset" state and can pass to a second operational state, that is a "set" state, upon application of an input signal which exceeds a given threshold. A subsequent transition of the input signal above another threshold, which may coincide with the previous one, returns the circuit to its original state, that is it "resets" it. This is the bistable behaviour of the circuit. However, if the reset signal does not appear within a predetermined time interval, corresponding to a time constant of the circuit, then the circuit returns on its own to the reset state, independently of the input signal in the manner of a normal monostable circuit. This dual behaviour of the "monostable trigger" can be exploited in order to construct systems having a great operational reliability, as will be described below.

In order to obtain from the circuit 312 a reliably monostable performance, the switching time interval of the circuit will have to be selected to be less than the half period of the tachometric signal at the maximum required frequency of operation.

The output signal from the "monostable trigger" 312 is fed to the base of an NPN transistor $T_{13}$ in a common collector configuration, which is biased via a collector resistor 314 and by an emitter resistor 16. Connected in parallel to the resistor 316 there is an earthed capacitor $C_3$.

The emitter of the transistor $T_{13}$ is connected to the input of a differentiating circuit 313 which differentiates the input signal, the output signal therefrom is applied to a bistable trigger circuit 320 which is also, preferably, a "monostable trigger" of the type described above. The switching interval of this circuit is selected to be longer than the maximum duration for which it is anticipated that the acceleration signal from the differentiator 313 can remain below the tripping threshold, based on the parameters of the braking system and on the typical characteristics of behaviour of the vehicle to which the system is fitted, on different surfaces.

The output of the trigger 320 is connected to a power amplifier 322 for the control of an actuator device 324 for control of the braking pressure in a brake system (not illustrated). This actuator 324 may be an electrically operated valve or other suitable known device, such as are used for anti-skid control in known systems.

The output of the trigger 320 is also connected in a feedback arrangement to the input of the differentiator 318, via two parallel circuit branches. One of these branches includes a timer circuit 330, such as a monostable circuit, for example a further "monostable trigger" of the type described above, or alternatively some other waveform generating circuit of suitable type, designed to take off current according to a very exact rate from an NPN transistor $T_{23}$, the base of which is connected to earth, and the collector of which is connected to the input of the differentiator 318. The other branch of the feedback circuit consists of a resistor 326 and a rectifier diode 328 in series with one another.

The circuit described above operates as follows:

The output signal of the "monostable trigger" 12, consisting of a series of identical impulses with pulse repetition frequency proportional to the speed of rotation of the wheel (not illustrated), charges the capacitor $C_3$ through the transistor $T_{13}$ which is connected as an emitter follower. The capacitor $C_3$ normally may discharge to earth via the collector-base junction of the transistor $T_{23}$ which is normally conductive. The signal at the terminals of the capacitor $C_3$ constitutes a fiducial signal proportional to the pulse repetition frequency of the signal output from the "monostable trigger" 312, and hence to the speed of rotation of the wheel. The derivative of this signal, which represents the acceleration of the wheel, and which appears at the output of the differentiator 318, controls the trigger 320.

When the acceleration signal at the input of the trigger 320 exceeds a predetermined negative threshold, corresponding to a deceleration of the wheel greater than the predetermined maximum permissible rate of deceleration at which skidding of the wheel becomes imminent, the trigger 320 changes its state and produces an output pulse of predetermined maximum duration, which activates the power amplifier 322 to control the actuator 24 to release the pressure from the brakes.

At the same time, the output signal from the trigger 320 reverse biases the diode 328 and simultaneously switches the state of the "monostable trigger" circuit 330. The output impulse from this circuit cuts off the transistor $T_{23}$, thus cutting off the discharge path to earth of the condenser $C_3$.

The "monostable-trigger" 330 has its own intrinsic timing period $\Delta t$ determined according to the criterion that the resumption of braking should take place at a suitable time before the angular velocity of the wheel approaches the velocity of the vehicle. At the end of this time period the "monostable trigger" 330 resets automatically, and the output signal applied thereby to the emitter of the transistor $T_{23}$, allows the capacitor $C_3$ to resume discharging to earth at a constant intervals, dependent upon the overall resistance of the circuit. In other embodiments the circuit 330 may be any other suitable kind of trigger circuit; the same considerations apply, but the rate of discharge of the capacitor $C_3$ will be different.

In FIG. 4 the curve I represents the variation of the speed of the vehicles plotted on the ordinate, in relation to time plotted along the abscissa. As discussed above, in view of the inertia of the vehicle, the speed decreases roughly linearly during braking, independently of fluctuations in the speed of the wheels.

The curve II represents the variation of the angular velocity of a braked wheel during a braking operation in which the anti-skid device intervenes. The speed of the wheel decreases more rapidly than the speed of the vehicle and at point A of curve II the slope of the line, which represents the angular acceleration of the wheel, reaches the point at which skidding is imminent. At the point A the anti-skid system operates. For the reasons discussed above the speed of the wheel continues to decrease for a short time and then it starts to rise again to approach the speed of the vehicle.

Curve III represents the variation of the voltage signal at the terminals of the condensor $C_3$. This is a fiducial signal which normally follows the mean value of the train of pulses emitted by the monostable trigger 312 until the instant at which the monostable trigger 30 is caused to change state. From this instant onwards, in view of its being impossible for it to discharge to earth, the capacitor $C_3$ remains at a constant voltage corresponding to that of the signal representing the speed of the wheel at the instant when the anti-skid system operated to initiate the release of braking pressure on the wheel. Capacitor $C_3$ remains at this voltage for a time interval $\Delta t$ corresponding to the timing interval of the trigger circuit 320, until the point B on the curve III. The capacitor $C_3$ then starts discharging again so the curve III starts to decrease towards the curve II. The voltage of the signal emitted by the monostable-trigger 12 and represented by the curve II, is lower than the voltage on the capacitor $C_3$ in view of the strong deceleration to which the wheel is subjected. However, due to the intervention of the anti-skid service the angular velocity of the wheel eventually starts to rise so that the voltage signal also starts to rise until, at the point D the curves II and III intersect. The trigger 320 is thus reset and so it de-energises the actuator 24 thereby resuming the braking of the wheel.

By using a "monostable trigger" of the type described above as the trigger 320 it is possible to obtain the important advantage, from the point of view of safety, that when in unusual braking situations the curves II and III are such that they would not intersect, the intrinsic monostable characteristic of the circuit 320 nevertheless causes a de-energization of the actuator 322 after the predetermined time delay of the circuit 320, thereby ensuring that the brakes are eventually reapplied and avoiding dangerous situations in which the brakes may be released for too long.

What is claimed is:

1. In an anti-skid control system for the brake of at least one wheel of a vehicle, of the type comprising an angular velocity transducer for detecting the angular velocity of said wheel and for producing an output signal representing said angular velocity, a braking control circuit connected between the output of said angular velocity transducer and said brake, said braking control circuit including means for differentiating said signal representing said angular velocity, and operating to release said brake when the derivative of said angular velocity signal exceeds a predetermined negative threshold value, the improvement wherein:

said braking control circuit comprises a first transistor, the base of said first transistor being coupled to said output of said angular velocity transducer, a threshold circuit having a first state and a second state, and operating to produce an output signal in said second state, brake pressure control means for controlling the braking pressure applied to said brake, said output signal of said threshold circuit being applied to said brake pressure control means to effect release of said braking pressure when said threshold circuit is in said second state, the emitter of said first transistor being earthed and also being connected to said threshold circuit, said threshold circuit commuting to said second state whenever the derivative of said angular velocity signal exceeds said predetermined negative threshold value, a reference signal generating circuit connected to the output of said threshold circuit, said reference signal generating circuit operating to produce a reference signal which is delayed by a predetermined time interval after the commutation of said threshold circuit to said second state of an angular velocity signal at the instant when said threshold circuit commutes to said second state and the value of said angular velocity signal after said predetermined time interval from said instant when said threshold circuit commutes to said second state, and detector means sensitive to both said reference signal and said angular velocity signal, said detector means operating to return said threshold circuit to said first state thereof, when said angular velocity signal and said reference signal both attain the same value, whereupon said brake pressure control means allow reapplication of said brakes, said angular velocity transducer produces an output signal the voltage of which represents said angular velocity of said wheel, and said braking control circuit comprises a capacitor connected between said emitter of said transistor and earth, a monostable multivibrator connected to the output of said threshold circuit, a second transistor of a type complementary to said first transistor, the base of said second transistor being earthed, the collector of said second transistor being connected to said emitter of said first transistor, and a second capacitor connected between the emitter of said second transistor and the output of said monostable multivibrator, the period of said monostable multivibrator being equal to said predetermined time interval and the output of said monostable multivibrator multiplied by the ration of capacities of said first and second capacitors determining the decrement by which said reference signal is less than said angular velocity signal at the instant when said threshold circuit commutes from said first state to said second state, said reference signal being constant.

2. In an anti-skid control system for the brake of at least one wheel of a vehicle of the type comprising an angular velocity transducer for detecting the angular velocity of said wheel and for producing an output signal representing said angular velocity, a braking control circuit connected between the output of said angular velocity transducer and said brake, said braking control circuit including means for differentiating said signal representing said angular velocity, and operating to release said brake when the derivative of said angular velocity signal exceeds a predetermined negative threshold value, the improvement wherein:

said braking control circuit comprises a first transistor, the base of said first transistor being coupled to said output of said angular velocity transducer, a threshold circuit having a first state and a second state, and operating to produce an output signal in said second state, brake pressure control means for controlling the braking pressure applied to said brake, said output signal of said threshold circuit being applied to said brake pressure control means to effect release of said braking pressure when said threshold circuit is in said second state, the emitter of said first transistor being earthed and also being connected to said second state whenever the derivative of said angular velocity signal exceeds said predetermined negative threshold value, a reference signal generating circuit connected to the output of said threshold circuit, said reference signal generating circuit operating to produce a reference signal which is delayed by a predetermined time interval after the commutation of said threshold circuit to said second state the value of said reference signal lying between the value of said angular velocity signal at the instant when said threshold circuit commutes to said second state and the value of said angular velocity signal after said predetermined time interval from said instant when said threshold circuit commutes to said second state, and detector means sensitive to both said reference signal and said angular velocity signal, said detector means operating to return said threshold circuit to said first state thereof, when said angular velocity signal and said reference signal both attain the same value, whereupon said brake pressure control means allow reapplication of said brakes, said angular velocity transducer produces an alternating output signal the frequency of which represents the angular velocity of said wheel, a pulse shaping circuit connected to the output of said angular velocity transducer, said pulse shaping circuit producing a train of pulses of constant width the pulse repetition frequency of which represents the frequency of said signal from said transducer, said reference signal generating circuit comprising:

a capacitor to the output of said pulse shaping circuit so as to be periodically charged by said signal pulses therefrom, a discharge circuit by means of which said capacitor can periodically discharge, said discharge circuit including a normally closed switching device, said threshold circuit comprising a differentiator circuit connected in parallel with part of said discharge circuit and a trigger circuit coupled to the output of said differentiator circuit, said trigger circuit having a first state and a second state and commuting to said second state when said output from said differentiator circuit exceeds said predetermined negative threshold, said trigger circuit being connected to said brake pressure control means and operating to control release of said brakes when in said second state, a timing circuit connected between said output of said trigger circuit and said switch device of said discharge circuit, said timing circuit operating to produce an output pulse to open circuit said switching device for said predetermined time interval after said trigger circuit has commuted to said second state to prevent discharge of said capacitor for this time interval.

3. The anti-skid control system of claim 2 wherein said switching device comprises a transistor the base of which is earthed and the emitter of which is connected to said timing circuit.

* * * * *